United States Patent
Pike et al.

(10) Patent No.: US 8,200,537 B2
(45) Date of Patent: Jun. 12, 2012

(54) INTEGRATED RETAILER PROCESS

(75) Inventors: Matthew Pike, Minnetrista, MN (US); Mark Gregory Mendel, Minneapolis, MN (US)

(73) Assignee: Digital River, Inc., Minnetonka, MN (US)

(*) Notice: Subject to any disclaimer, the term of this patent is extended or adjusted under 35 U.S.C. 154(b) by 1233 days.

(21) Appl. No.: 11/695,579

(22) Filed: Apr. 2, 2007

(65) Prior Publication Data

US 2007/0233580 A1    Oct. 4, 2007

Related U.S. Application Data

(60) Provisional application No. 60/788,413, filed on Mar. 31, 2006.

(51) Int. Cl.
*G06Q 30/00* (2006.01)
(52) U.S. Cl. .......................................... 705/26; 705/27.1
(58) Field of Classification Search .................... 705/26, 705/27
See application file for complete search history.

(56) References Cited

U.S. PATENT DOCUMENTS

| | | | |
|---|---|---|---|
| 6,996,538 B2 | 2/2006 | Lucas | |
| 7,085,737 B2 | 8/2006 | Dan et al. | |
| 7,197,480 B1 | 3/2007 | Chollon et al. | |
| 7,607,577 B1 * | 10/2009 | Yu et al. | 235/383 |
| 2007/0192215 A1 * | 8/2007 | Taylor et al. | 705/28 |

OTHER PUBLICATIONS

Greenfield et al.: "Amazon: We Site to Web Services," Network Magazine, Oct. 2004, v19i10pg58; Proquest #709151251, 6 pgs.*
Kulkarnl et al.: "Web Services: E-Commerce Partner Integration," IEEE Computer Society, Mar./Apr. 2005, pp. 23-28.*
McMillian, Robert; "A restful approach to Web services," Network World, Feb. 17, 2003, v20i7pg61; Proquest #291137791, 4pgs.*
Glass, Brett: "Tell your browser . . . ," InfoWorld, Sep. 2, 1996, v18i36pg37, Proquest #10142906, 3pgs.*
DR Solutions: Internet Archive Wayback Machine, www.archive. org; www.digitalriver.com; Mar. 23-25, 2005; 7 pgs.*

* cited by examiner

*Primary Examiner* — Robert M. Pond
(74) *Attorney, Agent, or Firm* — North Oaks Patent Agency; Shawn B. Dempster; Lynn M. Holly

(57) ABSTRACT

In accordance with one embodiment of the invention, a set of API's for integrated retailers to perform standard order fulfillment operations to fulfill and return products on behalf of their clients is described. A common catalog on a software platform is intended be a flexible common hub around which many different commerce models can be implemented. Integrated retailer is one such model on which e-commerce occurs. Integrated retailers are permitted to sell product from the common catalog with another company providing back-end fulfillment. The common catalog infrastructure's pre-existing XML catalog export facility provides product information to the retailer. The Retail Web Service (RWS) provides the fulfillment functions as a REST-style web service.

6 Claims, 3 Drawing Sheets

INTEGRATED RETAILER PROCESS

This application claims the benefit of U.S. Provisional Application No. 60/788,413 filed 31 Mar. 2006, entitled "Integrated Retailer Process," which is incorporated herein by reference

FIELD OF THE INVENTION

The present invention relates to order fulfillment operations to fulfill and return products on behalf of clients on the internet. More particularly, the present invention relates to a system and related tools for providing an integrated retailer process.

BACKGROUND OF THE INVENTION

The Internet is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies, which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the web". Other Internet resources exist for transferring information, such as File Transfer Protocol (FTP) and Gopher, but have not achieved the popularity of the Web. In the Web environment, servers and clients effect data transactions using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

The Internet also is widely used to transfer applications to users using browsers. With respect to commerce on the Web, individual consumers and businesses use the Web to purchase various goods and services. In offering goods and services, some companies offer goods and services solely on the Web while others use the Web to extend their reach.

With respect to these commercial activities and others, businesses and other content providers go through a highly manual process to set up mechanisms to facilitate business-to-business commerce. For example, in setting up customized catalogs for use between businesses, the items in the catalog are currently set up through telephonic communications. A customized catalog is also referred to as a "catalog". Manual configuration of the catalog as well as various terms and operating conditions also are discussed telephonically. After agreement is reached, then the catalog is configured and placed on a Web site. Other times, the catalog may be set up through face-to-face meetings between representatives of the different businesses. Such a mechanism takes time and manpower.

Therefore, it would be advantageous to have an improved method and apparatus for setting up a business-to-business commerce relationship. The present invention provides a solution to these needs and other problems, and offers other advantages over the prior art.

BRIEF SUMMARY OF THE INVENTION

The present invention is related to a software system that solves the above-mentioned problems. In accordance with one embodiment of the invention, a set of application programming interfaces (APIs) for integrated retailers to perform standard order fulfillment operations to fulfill and return products on behalf of their clients is described. A common catalog on a software platform is intended to be a flexible common hub around which many different commerce models can be implemented. Integrated retailer is one such model on which e-commerce occurs. Integrated retailers are permitted to sell product from the common catalog with another company providing back-end fulfillment. The common catalog infrastructure's pre-existing XML catalog export facility provides product information to the retailer. The Retail Web Service (RWS) provides the fulfillment functions as a representational state transfer (REST)-style web service. The RWS implementation is a relatively thin layer on top a set of core functionality shared with other common catalog models. This gives RWS access to the evolving set of tools for common catalog, such as catalog filtering. The REST architecture implements all services as HTTP GET and POST operations on URLs that represent business resources: Orders, Fulfillment Units, and Returns, etc. As such this architecture enables use of standard HTTP protocol features such as cache control and redirection to achieve great scalability and flexibility.

Additional advantages and features of the invention will be set forth in part in the description which follows, and in part, will become apparent to those skilled in the art upon examination of the following or may be learned by practice of the invention.

DETAILED DESCRIPTION

Figure 1:
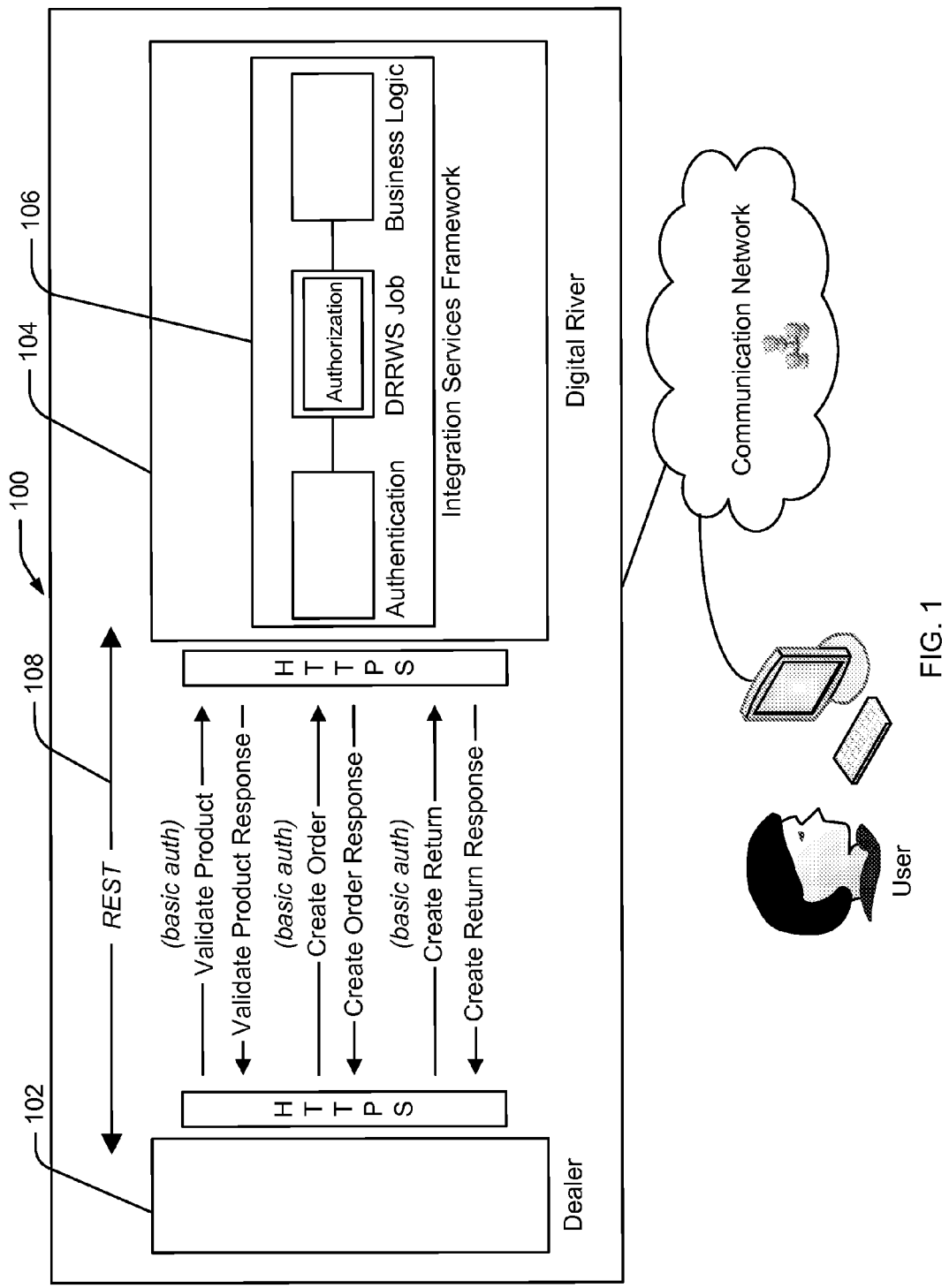
FIG. 1 shows an integration retailer process framework diagram.

Before moving into the detailed description a few commonly used terms need to be defined as shown in Table 1 below.

TABLE 1

| Term | Definition |
|---|---|
| Channel product | Product in a network common catalog |
| Dealer | In this document, means a company that sells products from the channel catalog and uses RWS to fulfill orders. |
| Dealer [Feed] Product | A channel product within a dealer's feed and data specific to that product-dealer combination, e.g., dealer cost. |
| DigitalLocker | Microsoft service for which is implemented a Delivery Partner service. Also called "Metro" |
| Retail Web Service | The web serviced defined by the document |
| Fulfillment unit | The quantum particle of fulfillment. The number of units associated with a completely fulfilled line item equals the line item's quantity. |
| Metro | See DigitalLocker |
| Private Product | A channel product for which the publisher has restricted sales to only specific dealers. |
| Product Variation | Inside a web service, products can have variations which are also products; only the leaf products of the resulting tree can be fulfilled [base product id is exposed in dealer feeds, allowing the dealer to group products if desired.] |
| Client | This is a business partner and may also be part of a corporate partner program, or Integrated Channel Partner Program (ICPP). |
| Product ID | This is a unique identifier to every product that is available in the product catalog. |
| Integrated Channel Partner Program (ICPP) | This is the specific product offering provided by ecommerce business that enables clients the ability to offer the ecommerce business product catalog to their customers. |
| Application Programming Interface (API) | A set of routines that an application uses to request and carryout lower level services. |
| Universal Resource Locator (URL) | A standard of the Internet that allows for the precise discovery of web sites and other web resources. |
| Business Process | 'Business Process' is a term used to describe a data trading agreement between two companies. The business process is all encompassing and includes both the business rules and the technical rules behind the data exchange. |
| eXtensible Markup Language (XML) | The datafeed ecommerce business sends to the Client; and the order fulfillment requests the Client sends to ecommerce business will be formatted in XML. |

In accordance with one embodiment of the invention, a set of API's for integrated retailers to perform standard order fulfillment operations to fulfill and return products on behalf of their clients is described. A common catalog on a software platform is intended be a flexible common hub around which many different commerce models can be implemented. Integrated retailer is one such model on which e-commerce occurs. Integrated retailers are permitted to sell product from the common catalog with another company providing back-end fulfillment. The common catalog infrastructure's pre-existing XML catalog export facility provides product information to the retailer. The Retail Web Service (RWS) provides the fulfillment functions as a REST-style web service. Representational State Transfer (REST) is an architectural style for distributed hypermedia systems like the web. The RWS implementation is a relatively thin layer on top a set of core functionality shared with other common catalog models. This gives RWS access to the evolving set of tools for common catalog, such as catalog filtering. The REST architecture implements all services as HTTP GET and POST operations on URLs that represent business resources: Orders, Fulfillment Units, and Returns, etc. As such this architecture enables use of standard HTTP protocol features such as cache control and redirection to achieve great scalability and flexibility.

A set of API's for integrated retailers perform standard order fulfillment operations to fulfill and return products on behalf of their clients. Integrated retailers will integrate with an ecommerce platform so that fulfillment requests and transactions are processed on the platform. The platform delegates the fulfillment request for download URL and digital right to the originating platform. A Dealer order may contain fulfillment requests to be delegated to more than one platform. Products will have a grace period for which they may still be ordered after being removed from an integrated retailers catalog. Integrated retailers will have access to products with double-byte characters. Local taxation requirements are also fulfilled, as are return processing. Reissue of product keys and security of each dealer catalog is also performed. Integration retailer process also supports external contract between an integrated retailer and a publisher where the integrated retailer pays the publisher.

FIG. 1 provides an overview of a business process 100 formed to complete the integrated retailer process. The process consists of a set of API's for integrated retailers to perform standard order fulfillment and order return business processes. A dealer 102 (defined previously) creates an order using standard REST 108 processes. This order is received by an ecommerce platform 104 that contains an integrations services framework 106. ValidateProduct, ValidateProductResponse, CreateOrder, CreateOrderResponse, CreateReturn, CreateReturn Response are the classes communicated utilizing XML between the dealer 102 and ecommerce platform 104.

REST Architecture

A REST full web service involves defining the service in terms of resources referenced by URIs, operated on by standard HTTP operations GET and POST. In addition, all GET operations will be safe and will be used whenever the operation is safe. POST will be used for all operations that change server state. As an example, the following would be a REST compliant operation.

```
POST http://digitalriver.com/.../fulfiller {
    Content-Type: text/xml
    <order>...
Result:
    Status: 201 Created
    Location: http://chan.digitalriver.com/fulfillment/dixon/1234
    <fulfillment uri=
    "http://chan.digitalriver.com/fulfillment/dixon/1234">
        ...
```

Reliable Delivery

Reliable execution of fulfillment requests is guaranteed as follows. Standard HTTP security will be used (SSL+Basic Auth) to authenticate client.
1. Client must include a client generated external order id in the fulfillment order.
2. If the client posts the order, but does not get a response from the server, the client may repeat the post until a valid response is obtained. The system shall return the same response for each received request with identical client order id. Only one fulfillment (set of licenses, etc.) will be performed.
3. A query interface might be provided whereby the client can check for the existence of an order.

URI Attributes

Several elements in the XML documents have the uniform resource identifier (URI) attribute. This attribute's value is a URI which identifies the resource represented by that element. Other XML documents will refer to that resource using that URI; referring attribute will have a name like resource-typeUri.

For example, the dealer must include the uri attribute on order elements sent to RWS:
<order uri=http://a.dealer.com/order/1234">...
RWS will respond with a fulfillment element like:

```
<fulfillment uri="http://digitalriver.com/fulfillment/52143"
orderUri=http://a.dealer.com/order/1234">
...
```

The format of the value is completely up to the creator of the resource. The dealer might send URIs consisting only of its internal order id. The only requirement is that it uniquely identifies the order and it is a maximum of 64 characters in length. A nested element's URI can be relative to an outer element's URI. The dealer created root element URIs may be valid, non-relative HTTP URIs. This is so that a user may, for example, send the dealer order status change notifications by posting to the order's URI.

Status

Operations will follow the HTTP protocol's status code and message conventions. The status code and message will also be duplicated in the response XML for the benefit of client implementations that choose to not access the response headers.

Operation Details

The following operations will be provided to manage the fulfillment lifecycle:

ValidateProductInfo
FulfillOrder
ReturnProduct

All API's will return a TransactionID uniquely identifying the request for tracking purposes. XPATH notation is used to describe the contents of the XML messages.

ValidateProductInfo

The purpose of this operation is to allow a dealer to validate product metadata, price and availability upon insert of a ecommerce business product to the dealer shopping cart. The dealer should not allow a product to be added to the customers shopping cart if the product is no longer available for sale. Implementation of this API by the dealer is not required, but encouraged.

Figure 2:
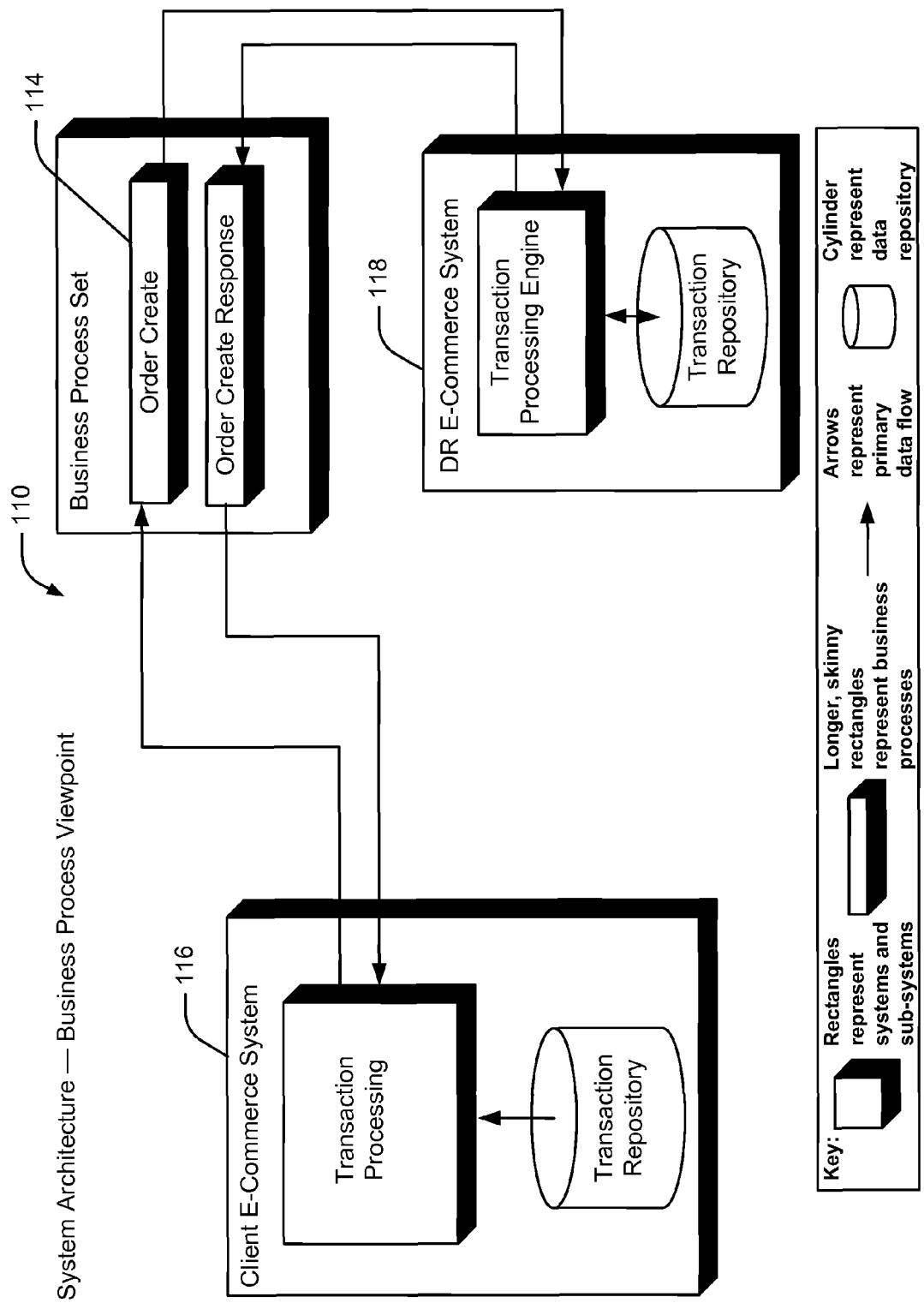
FIG. 2 shows an overview diagram of an order create business process.

FIG. 2 provides an overview of an OrderCreate business process 110. An Order Create Service allows the integrated retailer (IR) to submit an order to the ecommerce system. Once the IR processes the transaction by performing their own client-specific transaction processing functions such as payment authorization, fraud checks and verification of acceptable order info, they will use the ecommerce system's OrderCreate 114 API to submit the order to for fulfillment. For a digital product, this fulfillment information consists of an ecommerce system hosted download URL that the IR will deliver to the customer who placed the order so they can download the product they purchased. Sometimes products may require a serial number or unlock code to be given to the customer in addition to the download URL. In these cases, the OrderCreate 114 service offering response will return this information to the IR for display on their site to the customer at the time of purchase. It will be understood that a client ecommerce system 116 and a hosted ecommerce system 118 contain a transaction processing engine and transaction repository.

Figure 3:
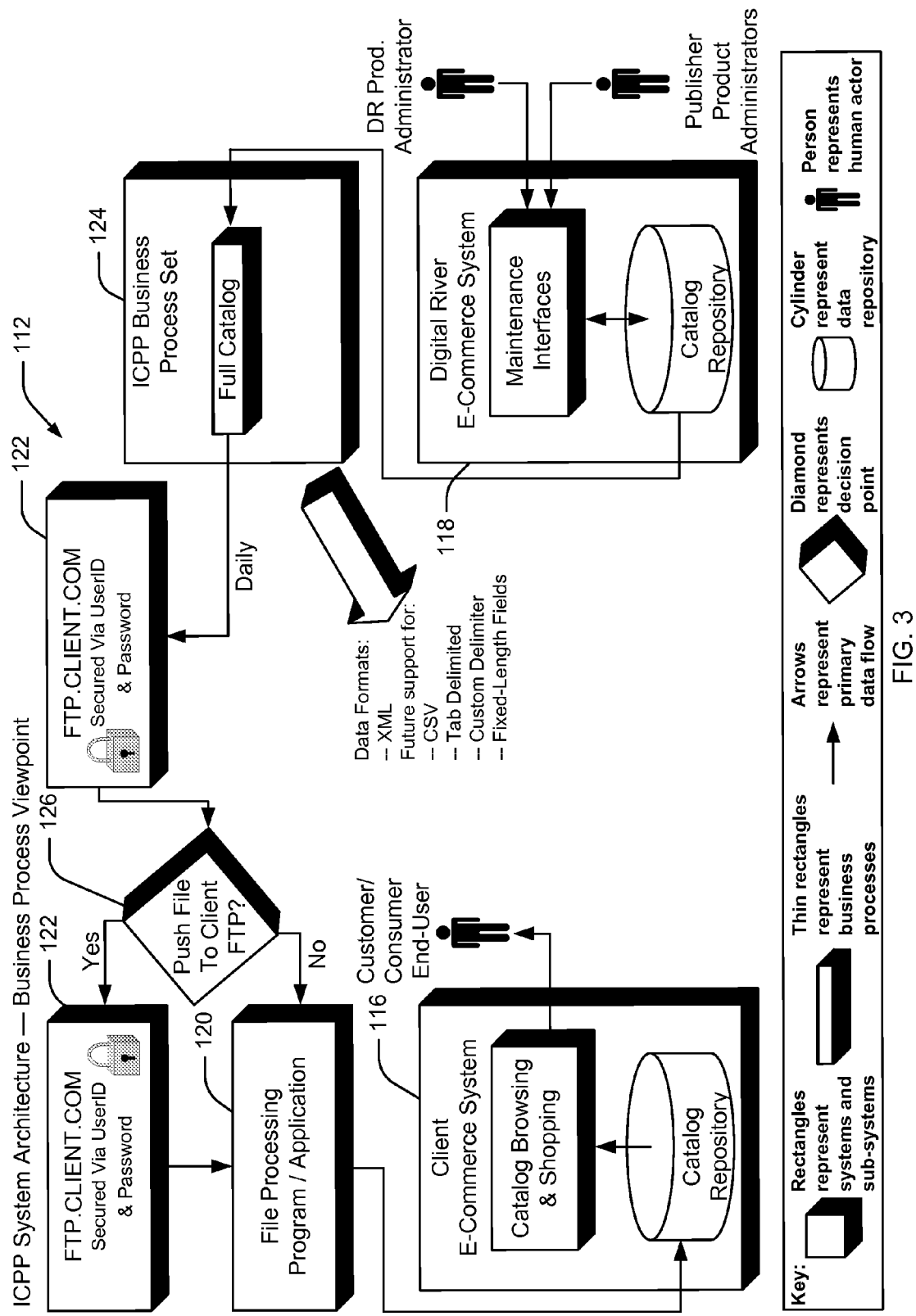
FIG. 3 describes a diagram for an ICCP overview process.

Referring now to FIG. 3, an overview of a product catalog business process 112 is shown. The product catalog service provides a catalog feed of available products for sale by the IR. This feed is available in xml format and can be transferred via FTP 126 to an FTP server location 122 for the IR to consume. It will be understood that a client ecommerce system 116 contains catalog browsing and shopping and a catalog repository. It will also be understood by one of ordinary skill in the art that a hosted ecommerce system 118 contains a maintenance interface and catalog repository. A file processing application 120 and an ICPP business process set 124 aid the catalog feed to FTP server locations 122.

FulfillOrder

Dealer sends an order to RWS and receives a fulfillment in response.

TABLE 2

Fulfill Order

| URI | HTTP Method | Request Element | Response Element |
| --- | --- | --- | --- |
| http://integration.digitalriver.com/integration/job/request/DRRWS?r=fulfiller | POST | order | fulfillment |

TABLE 3

Request Message

| Attribute or Element | Description |
| --- | --- |
| order@uri | Dealer's identifier for this order. Max 64 characters (for now) |
| order/customer@uri | Dealer's identifier for this customer |
| order/customer//* | Customer information (needed by customer service) |
| order/lineItems/lineItem@uri | Identifies line item. May be relative to the order uri, e.g., "1" |
| order/lineItems/lineItem/productId | Value taken from the catalog feed |
| order/lineItems/lineItem/expectedUnitPrice | Value taken from the catalog feed (price/type = DEALER_COST) |
| order/lineItems/lineItem/quantity | Quantity for this line item |

TABLE 4

Response Message

| Attribute or Element | Description |
| --- | --- |
| fulfillment@uri | Identifies this fulfillment transaction |
| fulfillment@orderUri | The order@uri identifying the order of which this is the fulfullment |
| fulfillment/status/code | 201 - Success: all line item units completely fulfilled<br>202 - Partial success: order was valid, but some line items could not currently be fulfilled<br>400 - Bad request: could not be understood by the server due to malformed syntax<br>401 - Unauthorized: see 0Authentication<br>409 - Unfulfillable: one or more units cannot be fulfilled. Details are provided in corresponding unit/status (404)<br>500 - Server error<br>503 - Resource temporarily unavailable (licenses?); retry later (we could set a Retry-After header) |
| *//status/message | A description of the corresponding status code |
| fulfillment/totalCharge | Sum of the unit/actualPrices |
| fulfillment/units/unit@uri | Identifies this fulfillment unit. Format: |
| fulfillment/units/unit@lineItemUri | References the order line item of which this is a fulfillment. The number of units for a given line item will be the line item's quantity (for a 201 status fulfillment) |
| fulfillment/units/unit/status/code | 201 - Success: the unit will contain licenses, actualPrice and downloadUrl<br>404 - Not Found: the requested product is permanently unavailable.<br>503 - Unavailable: not all of the licenses could be generated at this time, but will become available in future. The fulfillment/status/code will be 202. |
| fulfillment/units/unit/status/actual Price | The amount charged to the dealer's account for this unit |
| fulfillment/units/unit/status/downloadUrl | The URI the customer uses to download the product |
| fulfillment/units/unit/status/licenses/license/type | Description of the kind of license, e.g. serial #, unlock code, etc. |
| fulfillment/units/unit/status/licenses/license/value | The actual serial # or unlock code |

TABLE 5

RWS Created URI formats

| fulfillment@uri | http://integration.digitalriver.com/integration/job/request/DRRWS?r=fulfillment/requistionId/ |
| fulfillment/units/unit@uri | http://integration.digitalriver.com/integrationh/job/request/DRRWS?r=unit/lineItemId-seqNo |

Dealer sends a return request to a fulfillment unit URI.

TABLE 6

ReturnProduct

| URI | HTTP Method | Request Element | Response Element |
| --- | --- | --- | --- |
| http://integration.digitalriver.com/integration/job/request/DRRWS?r=unit/lineItem/d/QuanId | POST | returnRequest | returnReceipt |

TABLE 7

Request Message

| Attribute or Element | Description |
| --- | --- |
| returnRequest@uri | Dealer generated transaction identifier |
| returnRequest/reason | One of: CANCELLED_BUT_SHIPPED CAN_NOT_DOWNLOAD CUSTOMER_SATISFACTION_ISSUE DAMAGED_PRODUCT_DELAYED_SHIPPING DUPLICATE_ORDER ORDER_PROCESSING_ERROR ORDERED_WITHOUT_PERMISSION PHONE_ORDER_ERROR REFUSED_ORDER UNDELIVERABLE_ADDRESS WRONG_PRODUCT |
| return Request/comment | |

TABLE 8

Response Message

| Attribute or Element | Description |
| --- | --- |
| returnReceipt@uri | Identifies this transaction |
| returnReceipt @ returnRequestUri | |
| returnReceipt/status@code | 404 - Not found: no such unit |

Payment Setup

The following setup is used to support the payment requirements for the integrated retailer process:
1—Site owning company will be setup as the Merchant of Record (MOR)
2—The site owning company will use the no-op payment service.
3—All orders created for an RWS enabled site will use a "purchaseOrder" payment method.

Order Taker Failover and Concurrency Issues

Failover may cause duplicate orders which must be resolved at some point after the requisition data is merged on operational data source (ODS). Initially it may need to run on ODS like DigitalLocker.

Error Handling

There are two types of errors—Transient and Permanent. Transient errors are a result of requests that cannot be fulfilled, but should be resubmitted at a later time. Line Item pending digital rights or unable to communicate with third party system are examples of transient errors. Permanent errors are a result of requests that will never be fulfilled no matter how many times the request is submitted. An example of a permanent error would be a FulfillOrder request containing a retired product.

Integration Services

RWS uses a job management services provided by an integration services (for example, com.digitlariver.integration). The webservices exposed by RWS will be deployed on the servlet framework provided by integration services (com.digitalriver.integration.servlet). Within this framework a single process will specify the single Job subclass that dispatches all RWS requests. A ProcessConfiguration will need to be created for each integrated dealer site.

Job Log Events

A logging infrastructure will be created to log events occurring within the network channel API calls. A logging interface, com.digitalriver.netchan.arch. NetworkChannelLogger has two implementations:
1. To support logging of API calls made by Integration Services—com.digitalriver.rws.integration.NetworkChannelIntegrationLogger
2. To support logging of API calls made by Microsoft Metro, (which do not utilize Integration Services)—com.digitalriver.client.microsoft.metro.dp.MetroLogger.

Security

Security concerns itself with two fundamental questions: are you who you say you are (authentication); are you allowed to do what you are trying to do (authorization). RWS supports both authentication and authorization.

Also, there is an additional security requirement which RWS supports, namely, each platform's Integrated Retailer will be represented in on the platform as a 'Site'. This requirement will partially dictate the implementation of authentication and authorization within RWS.

Security also addresses the issue of confidentiality, that is, how can two parties exchange messages without being eavesdropped by a third party. RWS also support secure transport of messages.

Authentication

RWS exposes a set of webservices. These webservices will be deployed within the Integration Services servlet framework. As of this writing the framework does not support an adequate authentication mechanism. With that said the framework is being enhanced to provide authentication services which RWS will then be able to leverage.

The Integration Services servlet framework will be providing authentication at a 'ProcessConfiguration' level. Three types of authentication will be available: UserBasedAuthenticator; ProcessConfigurationBasedAuthenticator; CustomAuthenticator. RWS uses a 'UserBasedAuthenticator' method.

The 'UserBasedAuthenticator' method makes use of the industry standard 'Basic-Auth' over HTTP. Basic-Auth provides a username and password combination that can be used to authenticate a user.

RWS needs to scope a user to a specific site. In order to accommodate this requirement RWS will format the Basic-Auth username as 'userlogin@siteID" where 'userlogin' and 'siteID' are the platform's notion of 'siteID' and a user's 'userlogin'.

Upon successful authentication the servlet framework will construct a user 'Principal'. If authentication is not successful the framework will construct the appropriate error.

Authorization

Once authenticated the 'Principal' will be passed to the RWS 'Job'. The RWS 'Job' will be responsible for dispatching the incoming webservices request to the appropriate business logic. Before dispatching to the business logic authorization will be preformed. The RWS 'Job' will be responsible for performing authorization of the provided 'Principal'. Authorization will occur at the application level against a pre-defined access control list (ACL).

The ACL associates a role with a set of allowed operations. Each 'Principal' will have an associated role. The following code fragment illustrates how to obtain the role from a 'Principal':

```
if (!requestContext.getUser( ).hasRole (ROLE_DEALER_STORE))
    throw new AuthorizationError (...);
```

The following table illustrates the ACL.

TABLE 9

| Role | Allowed Operations |
| --- | --- |
| Integrated Retailer Store | Create & maintain fulfillment requests |
| Integrated Retailers Customer Service | Request & maintain returns for site |
| Shopper | No operations currently. User may be the customer of a requisition. |

RWS also uses authorization to perform data scoping. A 'Principal' must belong to a Platform Integrated Retailer site in order to issue requests on behalf of that dealer. Again, this is enforced at the application layer.

Secure Transport Mechanism

RWS requires and supports that all communication occur over a secure transport layer. Secure Sockets Layer (SSL) is an industry standard mechanism for establishing a secure channel of communication between two systems. All communication between RWS and interested parties will take place over a SSL connection.

Establishing communication over SSL can be taxing on systems. One popular solution to this problem is to use specialized hardware when establishing a SSL connection. Integration retailer process deployment infrastructure utilizes this solution.

By agreeing to use hardware accelerated SSL the current infrastructure makes some requirements of RWS. For example, in order to enforce that all communication is over a secure transport layer RWS will need to check a special HTTP header attribute "SSL" for a value of "true".

DigitalLocker Implementation (Metro)

The initial Metro implementation used Sun's Java web services developers toolkit (JWSDP) libraries to provide SOAP transport. The MetroDeliveryPartnerService dispatched all Metro requests to various command objects. Both the dispatcher and the command object interfaces were derived from Microsoft's web services description language (WSDL) and used data types defined therein, e.g. ESD_RESULT.

The RWS FulfillOrder operation requirements are met by a Metro DP_ChargeCustomer operation followed by DP_GetDownloadURL with the following differences.
- The service definition must not be coupled to Microsoft's WSDL.
- The dealer varies by request, rather than being fixed as Microsoft.
- The company periodically bills the dealer, rather than using credit card payment.
- A single request must create the requisition and return all licenses and download URLs.

Dealer Information

Dealer-specific information (site, etc.) which Metro stores in the application attribute MetroConfig must be moved to a request attribute and populated based on the authenticated principal.

Payment Strategy

The ChargeCustomer command is refactored so that all of its payment information and behavior is encapsulated in a PaymentStrategy object which is passed as a parameter. There are two implementations: MetroPaymentStrategy and RwsPaymentStrategy. MetroAdapter will create the MetroPaymentStrategy and pass the credit card info inside it. The RwsPaymentStrategy will encapsulate the RWS payment strategy where the purchase order payment method will be used.

Requisition Facade

The RequisitionFacade delegates requisition/lineItem pricing calculations to the pricing module where prices are retrieved from a price list. The RequisitionFacade enhances to optionally populate line item prices from values retrieved from the integrated retailer. This configuration is retrieved from the ChanClientConfig class.

Session Strategy

The ChargeCustomer command is refactored so that all of its session and transaction behavior is encapsulated in a Session Strategy object.

TABLE 9

| Request Fulfillment | |
|---|---|
| Information | Details |
| Use case name | Request Fulfillment |
| Primary actor | Retailer |
| Basic course of events | 1. Customer submits order on retailer's site.<br>2. Retailer sends line items that require digital delivery to Platform<br>3. Platform receives request |

TABLE 9-continued

| Request Fulfillment | |
|---|---|
| Information | Details |
| | 4. Platform returns download URL and digital right for each line item to the retailer.<br>5. Retailer delivers URL and digital right to Customer. |
| Extensions | Dealer verifies product data when customer adds product to the shopping cart (prior to submitting order)<br>Dealer is notified of a transient failure and is instructed to retry.<br>Dealer is notified of a permanent failure and what the problem is.<br>Dealer does not receive a response<br>Dealer receives 404 error. |

TABLE 10

| Capture Fulfillment Request | |
|---|---|
| Information | Details |
| Use case name | Capture Fulfillment Request |
| Primary actor | Ecommerce platform |
| Success guarantees | Dealer receives download URL(s) & digital right(s) or is notified of a failure and to retry the order again later. |
| Trigger | Customer submits order on a Integrated Retailer Website |
| Basic course of events | 1. Platform receives fulfillment request for a customer order from a Retailer.<br>2. Platform parses the request into separate line items for each product in the request.<br>3. Platform delegates each line item request to the platform that owns the product.<br>4. Platform waits to receive the download URL and digital right for each line item.<br>5. Platform sends the download URL and digital right for each line item in a single message back to the Retailer.<br>6. Platform records fulfillment for that Dealer. |
| Extensions | Platform may send a delegation request to multiple platforms for different products in the same order.<br>Platform may not receive the URL and digital right for a product from the original platform.<br>Fulfillment request includes a product that is no longer available.<br>Fulfillment request includes multiple quantities for a product in the order.<br>Fulfillment request includes multiple digital rights per line item unit. |

CommonCatalog

The CommonCatalog is a collection of all the products that can be sold by Integrated Retailers. By being implemented in a platform, this model forbids products from being removed from the CommonCatalog; they may only be retired. CommonProductInfo currently maps easily to a Platform Product Variation that has no child variations. The defaultCost is the cost-of-goods stored in the common catalogs COGS pricelist.

DealerFeedProductInfo

DealerFeedProductInfo is the information needed for a particular product that is included in a particular DealerFeed.

Dealer Specific Product Filtering

A new product filtering class is created verify and filter products that do not have a cost associated with them. This filtering class is associated with integrated retailer export feeds.

Export Feed Logging

Logging functionality is added to the export feed for purposes of reporting errors as well as reporting what products have been filtered during the filtering process. The framework will use the same pattern as the bulk loader product import process.

Cost Export Handler

A new pricing export handler is created to calculate integrated retailer product cost and populate pricing beans accordingly. This CostExportHandler is added as an extended attribute to the process configuration version as an additional export handler.

```
<?xml version="1.0" encoding="UTF-8"?>
<Map type="java.util.HashMap">
    <Collection key="productExportHandlers" type="java.util.ArrayList">
<String>com.digitalriver.bulkloader.exporter.product.handler.CostExportHandler</String>
    </Collection>
    <Collection key="productExportFilters" type="java.util.ArrayList">
<String>com.digitalriver.bulkloader.exporter.product.filter.CostExportFilter</String>
    </Collection>
</Map>
```

TABLE 11

Fulfillment Requirements

| ID | Requirement |
|---|---|
| 1. | Platform must be able to log and audit fulfillment requests |
| 2. | Platform must be able to accept product feeds from other platforms and incorporate them into the Integrated Retailers Common Catalog. The Integrated Retailers Catalog must also accept products from platform that may include double-byte characters. |
| 3. | Platform must have a separate catalog for each Integrated Retailer. Costing is tied to each Dealer catalog in Platform. |
| 4. | Platform must be able to capture a fulfillment request from a Dealer and delegate the request to the correct platform. Platform must support delegating fulfillment requests to more than one platform in the same order. |
| 5. | Platform will generate a unique order ID and collection of line item IDs for each fulfillment request(s) that come in from a Dealer and tie that order ID to the Dealer's order ID and the line item IDs to the Dealer's line item IDs. |
| 6. | Platform will need to support retry functionality for fulfillment requests that fail. Should Platform return partial orders to a Retailer or if any part of the fulfillment requests fails, should the whole order return a fail? |
| 7. | Platform must be able to delegate fulfillment requests to a platform's primary and failover or backup processing handlers. |
| 8. | Platform must be able to generate a feed of the products in the Integrated Retailer Common Catalog for each Dealer that signs a Integrated Retailer contract. Dealers must be able to access the product filtering pages to choose which products are part of their Integrated Retailer Catalog. Platform will create only one feed for each Dealer which may contain products originating from multiple platforms. Platform will update the feed via optional delta changes and/or complete resends of the feed. |
| 9. | Platform must support contracts between vendors and Integrated Retailers for products that could have different rates. If the Dealer is going to pay the Publisher, Platform will set the DR cost to zero. |
| 10. | Platform will support two models of revenue for DR depending on the contract signed between DR and the Integrated Retailer. Platform will support a transactional fee model, where a negotiated rate for each fulfillment request will be invoiced. Platform will invoice based on a percentage of the fixed cost of the product when a fulfillment request is received. Platform will be able to support both models for a single Dealer. |
| 11. | Platform must be able to accept products in the Integrated Retailer Catalog that are in USD or other currencies. Platform must be able to support payments in USD or other currencies. |
| 12. | Retailers must have a process to verify a product's availability in the Integrated Retailer Catalog, prior to submitting a fulfillment request. (similar to the Metro integration) |
| 13. | Every Publisher with a product in the Integrated Retailer Catalog must have a company setup in Platform. Payments for Integrated Retailer sales to Publishers will occur in Platform. |

Integrated Retailer Web Services Overview

Technical Overview

The following sections are intended to provide information on how to implement the service offerings of the Integrated Retailer. This system as designed strives to use the best and most standardized technologies in the industry in order to make the offering more universal in nature so that most clients will not have any major issues understanding the workings of the system and also so that there are no proprietary aspects that would make the implementations more difficult.

XML, HTTPS, and FTP are the main technical vehicles of standardization. Most IT departments will be familiar and comfortable with these technologies and would have implemented internal systems or subsystems in support of these universal, web-based technologies that have had a huge affect in the integration of the Internet and its services. XML is the primary data formatting protocol for all the APIs and acts as the mechanism that describes the data offered in each business process. HTTPS and FTP are the communication protocols (real time and batch, respectively) that are employed by the APIs. HTTPS is used for the real time business processes used to create orders described in this integration document. FTP is used for the batched product catalog business process described in a separate document.

Order Fulfillment

Order Create Description

Once the product catalog has been imported into the client's eCommerce system, the order create business process can be enabled. For this process, the client will process the transaction performing payment authorization, fraud check, and other client-specific transaction processing functions implemented via their eCommerce solution.

After these processes have run so that the client knows the customer and order are acceptable, they will use the Order Create API to submit the order to ecommerce provider for fulfillment. For a digital product, this fulfillment information consists of a ecommerce business hosted download URL that the client delivers to the customer who placed the order so they can download the product they purchased. Sometimes products may require a serial number or unlock code to be given to the customer in addition to the download URL in order to install the product properly. In these cases, the Order Create business process returns this information for the client to display on the site to the customer at the time of purchase, in the customer service interface that the customer has access to, and also in the email notification that is sent out to the customer.

The business process uses XML and HTTPS since the APIs are real-time in nature. Clients should consider coding in a timing feature so that in the very rare case where the call to the ecommerce business server takes over ten seconds or so, they return a page to the customer indicating that they shall follow up with the information later to the customer that they need in order to get the product that they purchased.

TABLE 12

Business Process Specifics

| Characteristic | Specification |
| --- | --- |
| Business Process Type | Real-Time Only |
| Communication Protocols | HTTPS Only |
| Data Formats Available | XML Only |

Submitting Identical Order Twice

If the Client inadvertently submits the same order twice (i.e., the same external order id and line items), an ecommerce business web host will accept the request and pass back the same information via the OrderCreate Response that it did in previous order submission(s). If one or more of the line items was pending digital rights, the ecommerce business web host will attempt to obtain the digital rights before sending the response.

Inactive Items

Occasionally products on the ecommerce business web host side can be deactivated as part of the normal course of business activities with respect to product catalog maintenance. If a product that a Client has as part of their catalog is deactivated on the ecommerce business web host side, the return response will contain an error code.

The following table is intended to list out all of the data that is included in the order create business process.

TABLE 13

Detailed Field Descriptions

| FIELD NAME | FIELD DEFINITION | DATA TYPE | MAX LENGTH |
| --- | --- | --- | --- |
| order URI | URI of the order that the client submits - uniquely identifies the order to Digital River | VARCHAR2 | 64 |
| customer URI | URI of the customer that submitted the order - uniquely identifies the customer to ecommerce web host | VARCHAR2 | 128 |
| ip-addr | IP Address of the computer that was used to submit the order | VARCHAR2 | 15 |
| email | Email address of the customer that submitted the order | VARCHAR2 | 255 |
| firstName | First Name of the customer | VARCHAR2 | 255 |
| lastName | Last Name of the customer | VARCHAR2 | 255 |
| billingAddress | Billing Address of the customer - contains several elements for Address, City, State, Postal Code, Country, and Phone. | | |
| line1 | First line of the Street Address | VARCHAR2 | 255 |
| line2 | Second line of the Street Address | VARCHAR2 | 255 |
| city | City the customer's address is in | VARCHAR2 | 128 |
| state | State the customer's address is in | VARCHAR2 | 64 |
| postalCode | Postal code for the address given | VARCHAR2 | 32 |
| country | Country code for the customer's address | VARCHAR2 | 128 |
| Phone | Phone number of the customer | VARCHAR2 | 128 |
| lineItems | Collection of elements identifying each line item in the order. | | |
| lineItem URI | Unique URI for each line item in the order | VARCHAR2 | 128 |
| productID | Digital River's unique ID for the product | VARCHAR2 | 64 |
| expectedUnitPrice | Contains two data elements, amount and currencyCode | | |
| amount | Amount stored in the client's e-commerce system for the product. | NUMBER | (18, 2) |
| currencyCode | Type of currency the amount is in. | VARCHAR2 | 64 |
| quantity | Number of units ordered for the line item | NUMBER | (10) |

XML Schema & XML Example

A schema is provided in Table 21 that describes how the XML is formed to construct the product catalog information. The following is an example of an XML OrderCreate submission from a Client.

```
<?xml version="1.0"encoding="UTF-8"?>
<rws:order uri="http://dealer.acme.com/order/12345A6/"
xmlns:rws=
"http://integration.digitalriver.com/2005/10/RetailWebService"
    xmlns:xsi="http://www.w3.org/2001/XMLSchema-instance"
xsi:schemaLocation="http://integration.digitalriver.com/2005/
10/RetailWebService order.xsd ">
        <customer uri="http://dealer.acme.com/cust/42145">
            <ip-addr>127.0.0.1</ip-addr>
            <email>joe@yahoo.com</email>
            <firstName>Joe</firstName>
```

-continued

```
            <productId>x23456</productId>
            <expectedUnitPrice>
                <amount>23.56</amount>
                <currencyCode>USD</currencyCode>
            </expectedUnitPrice>
            <quantity>2</quantity>
        </lineItem>
    </lineItems>
</rws:order>
```

Order Create Response XML Schema & Example

Once a fulfillment request has been received, ecommerce business web host will provide an immediate response to this call. This response's XML format follows a specific XML schema provided in Table 21. The following table lists the fields that are included in the order create response business process.

TABLE 14

| FIELD NAME | FIELD DEFINITION | DATA TYPE | MAX LENGTH |
| --- | --- | --- | --- |
| fulfillment URI | Unique URI for the fulfillment request ecommerce web host has generated | VARCHAR2 | 128 |
| orderURI | The URI of the order this fulfillment request is in response to. | VARCHAR2 | 128 |
| status | Status of the order, contains two elements, code & message. | | |
| code | Unique number identifying the status response. | NUMBER | 5 |
| message | Description of the status response | VARCHAR2 | 512 |
| units | Collection of elements returning the status, download URL, and digital rights for the line item. | | |
| unit URI | Unique uri for the line item, also contains the corresponding lineItemURI from the order request. | VARCHAR2 | 128 |
| status | Status of the line item, contains two elements, code & message. | | |
| code | Unique number identifying the status response. | NUMBER | (5) |
| message | Description of the status response | VARCHAR2 | 512 |
| actualPrice | Actual cost of the product (may be different than the expected cost in the order request). Contains two elements, amount & currency code. | | |
| amount | Amount the product actually costs. | NUMBER | (18, 2) |
| currencyCode | Type of currency the amount is in. | VARCHAR2 | 64 |
| downloadURL | URL the customer will use to download the product | VARCHAR2 | 512 |
| licenses | Collection of elements for serial numbers or unlock codes (or both) for the product | | |
| license URI | Unique URI for the license for the product. | VARCHAR2 | 128 |
| type | Description of the type of license being returned, may be "serialNo" or unlockCode. | VARCHAR2 | 64 |
| value | The license itself. | VARCHAR2 | 2000 |

-continued

```
            <lastName>Doe</lastName>
            <billingAddress>
                <streetAddress1>Suite 231</streetAddress1>
                <streetAddress2>123 A St.</streetAddress2>
                <city>Nowheresville</city>
                <state>MN </state>
                <postalCode>66666</postalCode>
                <country>US</country>
                <phone>612-555-1234</phone>
            </billingAddress>
        </customer>
        <lineItems>
            <lineItem uri="#1">
```

The following table shows the values for status return codes. There are two types of return codes, one for the order itself, and one for each line item in the order. For orders with multiple products that are not successful, the line item order status will allow the client to pinpoint which product in the order caused the failure.

TABLE 15

| Order Status Codes | |
| --- | --- |
| 201 | Success: all line item units completely fulfilled |
| 202 | Partial success: order was valid, but some line items could not currently be fulfilled |

TABLE 15-continued

| | |
|---|---|
| | 400 - Bad request: could not be understood by the server due to malformed syntax |
| | 401 - Unauthorized: see 0Authentication |
| | 409 - Unfulfillable: one or more the line items cannot be fulfilled. Details are provided in corresponding line item status codes (404) |
| | 500 - Temporary service outage; retry later (we could set a Retry-After header) |
| Line Item Status Codes | 201 - Success: the unit will contain licenses, actualPrice and downloadUrl |
| | 404 - Not Found: the requested product is permanently unavailable. |
| | 503 - Unavailable: not all of the licenses could be generated at this time, but will become available in future. The fulfillment/status/code will be 202. |

Here is an example of a return response to the example order request earlier in the document. The earlier request was for two copies of the same product. This fulfillment response shows a license and unlock code for one of the products, and a pending digital rights response for the 2$^{nd}$ product.

Order Return Description

The order return business process is used when a client needs to reverse a particular order for a customer based on a customer service issue that the customer is experiencing. In this case, in order to reverse the transaction on the ecommerce business web host side, the Order Return API should be called which will notify Digital River to disable the customer's download URL. The Order Return business process works in a similar fashion as the Order Create business process in that it leverages XML and HTTPS and has a request and response message passing sequence.

TABLE 16

| Business Process Specifics | |
|---|---|
| Characteristic | Specification |
| Business Process Type | Real-Time Only for the Request |
| Communication Protocols | HTTPS Only |
| Data Formats Available | XML Only |

```
<?xml version="1.0" encoding="UTF-8"?>
<rws:fulfillment
uri="http://integration.digitalriver.com/integration/job/request/DRRWS/fulfillment/123/"
    orderUri="http://dealer.acme.com/order/12345A6/"
xmlns:rws="http://integration.digitalriver.com/2005/10/RetailWebService"
    xmlns:xsi="http://www.w3.org/2001/XMLSchema-instance"
xsi:schemaLocation="http://integration.digitalriver.com/2005/
10/RetailWebService C:\projects×-
stream\resources\ws\xsd\integration\rws\fulfill.xsd ">
    <status>
        <code>500</code>
        <message>Temporarily Unavailable</message>
    </status>
        <units>
        <unit uri="http://digitalriver.com/drws/fu/452455"
lineItemUri="1">
            <status>
                <code>200</code>
                <message>OK</message>
            </status>
            <actualPrice>
                <amount>23.56</amount>
                <currencyCode>USD</currencyCode>
            </actualPrice>
            <downloadUrl>ftp://foo/baz/bar.exe</downloadUrl>
            <licenses>
                <license uri="http://digitalriver.com/drws/lic/42">
                    <type>serialNo</type>
                    <value>1120348MB67198749756</value>
                </license>
                <license uri="http://digitalriver.com/drws/lic/523">
                    <type>unlockCode</type>
                    <value>1120348MB67198749756</value>
                </license>
            </licenses>
        </unit>
        <unit uri="http://digitalriver.com/drws/fu/45246"
lineItemUri="1">
            <status>
                <code>503</code>
                <message>temporarily unavailable</message>
            </status>
            <licenses/>
        </unit>
    </units>
</rws:fulfillment>
```

TABLE 17

Request Order Return
The following table is intended to list out all of the data that
is included in the order return business process.

| FIELD NAME | FIELD DEFINITION | DATA TYPE | MAX LENGTH |
| --- | --- | --- | --- |
| reason | Reason for the return, see the schema for the enumerated values of possible reasons. | VARCHAR2 | 256 |
| comment | Customer comments | VARCHAR2 | 2000 |
| Uri | URI of the order that requires a return. | VARCHAR2 | 64 |

XML Schema & XML Example

The schema for the Order Return XML is located in Table 21; here is an example of a return request from a Client.

```
<?xml version="1.0" encoding="UTF-8"?>
<rws:returnRequest uri="http://dealer.acme.com/unit/1636395390/1"
    xmlns:rws="http://integration.digitalriver.com/2005/10/RetailWebService"
    xmlns:xsi="http://www.w3.org/2001/XMLSchema-instance"
xsi:schemaLocation="http://integration.digitalriver.com/2005/10/RetailWebService returns.xsd ">
    <reason >CAN_NOT_DOWNLOAD</reason>
    <comment>testing</comment>
</rws:return Request>
```

TABLE 18

Order Return Response
The following table is intended to list out all of the data that is
included in the Order Return response business process.

| FIELD NAME | FIELD DEFINITION | DATA TYPE | MAX LENGTH |
| --- | --- | --- | --- |
| Status | Status Code of the return Request | NUMBER | 3 |
| uri | URI of the order | VARCHAR2 | 256 |
| returnRequestUri | URI of the return request | VARCHAR2 | 64 |

XML Schema & XML Example

The schema for the Order Return Response XML is located in Table 21; here is an example of an order return response sent to a Client.

```
<?xml version="1.0" encoding="UTF-8"?>
<ns1:returnReceipt
    returnRequestUri="http://dealer.acme.com/order/1636395390/1"
    uri="
https://drh1sys.digitalriver.com/integration/job/request/DRRWS?r=returnLiID/4562889"
    xmlns:rws="http://integration.digitalriver.com/2005/10/RetailWebService"
    xmlns:xsi=http://www.w3.org/2001/XMLSchema-instance>
        <status>
        <code>201</code>
            <message>The return unit request has been submitted
successfully.</message>
        </status>
</ns1:returnReceipt>
```

Integrated Retail/Channel Partner Program

Technical Overview

The following sections are intended to provide the people in IT roles with the clients of the ICPP information on how to implement the service offerings ecommerce business web host strives to use the best and most standardized technologies in the industry in order to make the offering more universal in nature so that most clients will not have any major issues understanding the workings of the system and also so that there are no proprietary aspects that would make the implementations more difficult.

XML, HTTPS, and FTP are the main technical vehicles of standardization. Most IT departments will be familiar and comfortable with these technologies and would have implemented internal systems or subsystems in support of these universal, web-based technologies that have had a huge affect in the integration of the Internet and its services. XML is the primary data formatting protocol for all the APIs and acts as the mechanism that describes the data offered in each business process. HTTPS and FTP are the communication protocols (real time and batch, respectively) that are employed by the APIs. HTTPS is used for the real time business processes used to create and return orders, which will be described in a separate integration document. FTP is used for the batched product catalog business process described in the following sections.

Business Process Details

Product Catalog Description

The business process implementation of the product catalog consists of client filling out the product profile form (which is included in the business users guide), ecommerce business web host sets up the business process according to this form, and then the client goes through the implementation and testing on their side to make the business process work. This business process is available in batch mode only because of the substantial amount of data that is being shared.

TABLE 19

Business Process Specifics

| Characteristic | Specification |
| --- | --- |
| Business Process Type | Batch Only |
| Communication Protocols | FTP Only |
| Data Formats Available | XML |

Models

The business process architecture diagram is shown below in FIG. 1 and is a combination of several views. It combines, a data flow view, an implementation view, and a process flow view into a common, condensed view intended to provide the developers less architectural views to deal with and make it simpler to understand and implement the ICPP. FIG. 8 shows a business process architectural diagram for a product catalog business process.

File Naming/Handling

The client will have one file created each time the product catalog extract is run. Files will be placed on the ecommerce business FTP server in the client's home directory under the /PRODUCTCATALOG directory or alternatively onto the client's FTP servers. Since ecommerce business archives files for 30 days, it is recommended that the client maintain an archive as well.

Importing the Catalog Feed

The export file will contain all the products that are currently available for purchase by a customer. When importing the file, a client will want to scan for products they have in their database but are no longer in their feed, as those products have been retired and should no longer be available for sale on their site. After the retired products are flagged in the client's database, the entire catalog feed should be re-imported so all updates and changed data elements are available in addition to new products.

Job Scheduling

Ecommerce business will export the full catalog once per day. It is recommended that the client import this full catalog every day to keep in sync with changes, receive new products, and retire products that are no longer available.

TABLE 20

Detailed Field Descriptions
The following table shows a data dictionary defining the fields included in the product catalog export feed.

| FIELD NAME | FIELD DEFINITION | XML TAG | DATA TYPE | MAX LENGTH |
| --- | --- | --- | --- | --- |
| Product ID | Ecommerce business unique identifier for a product. | productID | VARCHAR2 | 64 |
| Base Product ID | This ID can be used to group related products together. For instance, a Mac version and Windows version of the same product will have different product IDs but the same Product Group ID. | baseProductID | VARCHAR2 | 64 |
| External Reference ID | This ID uniquely identifies the external reference ID within ecommerce business (where the product originates from within ecommerce business network) | externalReferenceID | VARCHAR2 | 64 |
| CompanyID | ecommerce business specific company unique identifier | companyID | VARCHAR2 | 64 |
| Locale | Primary location where the product is sold | locale | VARCHAR2 | 16 |
| Product Name | The name identifier given to the product - could be short name. | productName | VARCHAR2 | 255 |
| Product Display Name | The formal name of the product, used for display purposes within the shopping interface. | displayName | VARCHAR2 | 255 |
| Short Description | Short Description Text (may contain new lines and/or HTML tags. | shortDescription | VARCHAR2 | 4000 |
| Long Description | Long Description Text (may contain new lines and/or HTML tags). | longDescription | CLOB | |
| Thumbnail | This is the ecommerce business's hosted URL for the particular product's thumbnail image. | thumbnailImageURI | VARCHAR2 | 255 |
| Detail Image | This is the ecommerce business's hosted URL for the particular product image. | detailImageURI | VARCHAR2 | 255 |
| Platform | Platform (OS, etc.) of a product. | platform | VARCHAR2 | 255 |

TABLE 20-continued

Detailed Field Descriptions
The following table shows a data dictionary defining the fields included in the product catalog export feed.

| FIELD NAME | FIELD DEFINITION | XML TAG | DATA TYPE | MAX LENGTH |
|---|---|---|---|---|
| Manufacturer's Name | Name of the manufacturer that this product belongs to. In the software case, this is the name of the software publisher. | manufacturer | VARCHAR2 | 64 |
| Manufacturer Part Number | Manufacturer's part number | mfrPartNumber | VARCHAR2 | 64 |
| Keywords | These are the keywords defined for the product. | keywords | VARCHAR2 | 2000 |
| Category | Ecommerce business's identifier for a category (can be used to map Dealer category tree to ecommerce business category tree). | category | VARCHAR2 | 255 |
| Price | Prices will have several data components associated with them, and there will normally be two prices included for each product, LIST & Dealer Cost. | price | | |
| Price (type) | Type will have one of two values: MSRP—Manufacturer's Suggested Retail Price DEALER_COST—amount ecommerce business will invoice for each fulfillment request received. | type | VARCHAR2 | 255 |
| Price (amount) | Numerical value | amount | NUMBER | (20,10) |
| Price (currency code) | ISO Currency Code for the type of currency the amount is listed in. | currencyCode | VARCHAR2 | 3 |
| Attribute | Attributes will have several data components associated with them and there will be numerous attributes included for each product. | attribute | | |
| Attribute (Name) | Name of the attribute | name | VARCHAR2 | 255 |
| Attribute (Value) | Value of the attribute | value | VARCHAR2 | 255 |
| Attribute (Family ID) | The ecommerce business specific family unique identifier that the attribute belongs to. | familyID | VARCHAR2 | 64 |
| Attribute (Family Name) | The ecommerce business specific family name that the attribute belongs to. | familyName | VARCHAR2 | 255 |
| AvailableQuantity | The quantity available to be sold on product | availableQuantity | NUMBER | 10 |

TABLE 21

XML Schema Description

Common Types

Within an order, there is an actual fulfillment request. Saving creates an order within the ecommerce system. Within common types, examples are "order type". Within order type are customer types or line item types. Within a customer type, there is customer information, such as street address, city, state, postal code, country and phone; line item types will be line item information. Example of line item type include: productId, expectedUnitPrice, and quantity.
Order Similar to fulfillment (below).
Fulfillment After receiving a request to an ecommerce system to fulfill an order, placing an order on the ecommerce platform
OrderFulfillment Request Example XML and Fullfillment Response Example XML After fullfillment, after a person requests it, ecommerce system will response back, fulfillment response, what client will receive from after creation of the order.
Return Request Upon actually placing order, the customer makes a request to return it. Within that is stored a return request type ("cancelled but shipped", "can not download", "customer Satisfaction issue", "damaged product," "delayed shipping", "duplicate order," "order processing error," "ordered without permission," "phone order error," "refused order," "undeliverable address," and "wrong product"). A reason and comment is required.
Return Receipt After a return, ecommerce system gives customer a response back with a code and a message as to the status of the request, such as "successful."

TABLE 22

The following provide examples of xml for some of the functions of the system. It
will be appreciated by those skilled in the art that other xml code could be
devised that performs the same functions without departing from the scope and
spirit of the present invention.

Message XML Schema

```xml
<?xml version="1.0" encoding="UTF-8"?>
<xsd:schema xmlns:xsd="http://www.w3.org/2001/XMLSchema"
targetNamespace="http://integration.digitalriver.com/2005/10/RetailWebSevice">
    <xsd:include schemaLocation="order.xsd" />
    <xsd:include schemaLocation="fulfill.xsd" />
</xsd:schema>
```

Common Types

```xml
<?xml version="1.0" encoding="UTF-8"?>
<xs:schema xmlns:xs="http://www.w3.org/2001/XMLSchema"
targetNamespace="http://integration.digitalriver.com/2005/10/RetailWebService"
xmlns="http://integration.digitalriver.com/2005/10/RetailWebService"
    xmlns:map="http://internal.digitalriver.com/2005/10/type-map-anno">
    <xs:complexType name="AddressType">
        <xs:sequence>
            <xs:element name="streetAddress1" type="xs:string" />
            <xs:element name="streetAddress2" type="xs:string" />
            <xs:element name="city" type="xs:string" />
            <xs:element name="state" type="xs:string" />
            <xs:element name="postalCode" type="xs:string" />
            <xs:element name="country" type="xs:string" />
            <xs:element name="phone" type="xs:string" />
        </xs:sequence>
    </xs:complexType>
    <xs complexType name="MoneyType">
        <xs:all>
            <xs:element maxOccurs="1" minOccurs="1" name="currencyCode"
                type="xs:string">
                <xs:annotation>
                    <xs:documentation>
                        Currency to be used for the amounts below. See the
ISO 4217
                        maintenance agency (http://www.bsi-
global.com/iso4217currency) for
                        more information, including a table of currency
codes.
                    </xs:documentation>
                </xs:annotation>
            </xs:element>
            <xs:element maxOccurs="1" minOccurs="1" name="amount"
type="xs:decimal" />
        </xs:all>
    </xs:complexType>
</xs:schema>
```

Order

```xml
<?xml version="1.0" encoding="UTF-8"?>
<xs:schema xmlns:xs="http://www.w3.org/2001/XMLSchema"
targetNamespace="http://integration.digitalriver.com/2005/10/RetailWebService"
xmlns="http://integration.digitalriver.com/2005/10/RetailWebService"
    xmlns:map="http://internal.digitalriver.com/2005/10/type-map-anno">
    <xs:include schemaLocation="types.xsd" />
    <xs:annotation>
        <xs:appinfo>
            <map:java package="com.digitalriver.netchan.rws.gen" />
        </xs:appinfo>
    </xs:annotation>
    <xs:element name="order" type="OrderType">
        <xs:annotation>
            <xs:documentation>
                This element forms the content of a FulfillOrderRequest.
            </xs:documentation>
        </xs:annotation>
    </xs:element>
    <xs:complexType name="OrderType">
        <xs:sequence>
            <xs:element name="customer" type="CustomerType" />
            <xs:element name="lineItems" type="LineItemsType" />
        </xs:sequence>
        <xs:attribute name="uri" type="xs:anyURI" use="required" />
    </xs:complexType>
```

TABLE 22-continued

The following provide examples of xml for some of the functions of the system. It will be appreciated by those skilled in the art that other xml code could be devised that performs the same functions without departing from the scope and spirit of the present invention.

```xml
    <xs:complexType name="CustomerType">
        <xs:sequence>
            <xs:element name="ip-addr" type="xs:string" />
            <xs:element name="email" type="xs:string" />
            <xs:element name="firstName" type="xs:string" />
            <xs:element name="lastName" type="xs:string" />
            <xs:element name="billingAddress" type="AddressType" />
        </xs:sequence>
        <xs:attribute name="uri" type="xs:anyURI" use="required" />
    </xs:complexType>
    <xs:complexType name="Line ItemsType">
        <xs:sequence>
            <xs:element name="lineItem" type="LineItemType"
minOccurs="1"
                maxOccurs="unbounded" />
        </xs:sequence>
    </xs:complexType>
    <xs:complexType name="LineItemType">
        <xs:sequence>
            <xs:element name="productId" type="xs:string" />
            <xs:element name="expectedUnitPrice" type="MoneyType" />
            <xs:element name="quantity" type="xs:nonNegativeInteger" />
        </xs:sequence>
        <xs:attribute use="required" name="uri" type="xs:anyURI" />
    </xs:complexType>
</xs:schema>
```

Fulfillment

```xml
<?xml version="1.0" encoding="UTF-8"?>
<!-- Generated from fulfillment.xml by XMLBuddy -->
<xs:schema xmlns:xs="http://www.w3.org/2001/XMLSchema"
targetNamespace="http://integration.digitalriver.com/2005/10/RetailWebService"
xmlns="http://integration.digitalriver.com/2005/10/RetailWebService"
    xmlns:map="http://internal.digitalriver.com/2005/10/type-map-
anno">
    <xs:include schemaLocation="types.xsd" />
    <xs:element name="fulfillment" type="FulfillmentType" />
    <xs:complexType name="FulfillmentType">
        <xs:sequence>
            <xs:element name="status" type="StatusType"/>
            <xs:element name="totalCharge" type="MoneyType" />
            <xs:element name="units" type="UnitsType" />
        </xs:sequence>
        <xs:attribute use="required" name="orderUri" type="xs:anyURI" />
        <xs:attribute use="required" name="uri" type="xs:anyURI" />
    </xs:complexType>
    <xs:complexType name="StatusType">
        <xs:sequence>
            <xs:element name="code" type="xs:integer" />
            <xs:element name="message" type="xs:string" />
        </xs:sequence>
    </xs:complexType>
    <xs:complexType name="UnitsType">
        <xs:sequence>
            <xs:element minOccurs="0" maxOccurs="unbounded" name="unit"
                type="UnitType" />
        </xs:sequence>
    </xs:complexType>
    <xs:complexType name="UnitType">
        <xs:sequence>
            <xs:element name="status" type="StatusType" />
            <xs:element minOccurs="0" maxOccurs="1" name="actualPrice"
                type="MoneyType" />
            <xs:element minOccurs="0" maxOccurs="1" name="downloadUrl"
                type="xs:string" />
            <xs:element name="licenses" type="LicensesType" />
        </xs:sequence>
        <xs:attribute use="required" name="lineItemUri"
type="xs:anyURI" />
        <xs:attribute use="required" name="uri" type="xs:anyURI" />
    </xs:complexType>
    <xs:complexType name="LicensesType">
        <xs:sequence>
            <xs:element name="license" type="LicenseType"
                minOccurs="0" maxOccurs="unbounded" />
```

TABLE 22-continued

The following provide examples of xml for some of the functions of the system. It
will be appreciated by those skilled in the art that other xml code could be
devised that performs the same functions without departing from the scope and
spirit of the present invention.

```
            </xs:sequence>
        </xs:complexType>
        <xs:complexType name="LicenseType">
            <xs:sequence>
                <xs:element name="type" type="xs:string" />
                <xs:element name="value" type="xs:string" />
            </xs:sequence>
            <xs:attribute use="required" name="uri" type="xs:anyURI" />
        </xs:complexType>
</xs:schema>
```

OrderFulfillment Request Example XML

```
<?xml version="1.0" encoding="UTF-8"?>
<rws:order uri="http://dealer.acme.com/order/12345A6/"
xmlns rws="http://integration.digitalriver.com/2005/10/RetailWebService"
    xmlns:xsi="http://www.w3.org/2001/XMLSchema-instance"
xsi:schemaLocation="http://integration.digitalriver.com/2005/10/RetailWebService order.xsd ">
    <customer uri="http://dealer.acme.com/cust/42145">
        <ip-addr>127.0.0.1</ip-addr>
        <email>joe@yahoo.com</email>
        <firstName>Joe</firstName>
        <lastName>Doe</lastName>
        <billingAddress>
            <streetAddress1>Suite 231</streetAddress1>
            <streetAddress2>123 A St.</streetAddress2>
            <city>Nowheresville</city>
            <state >MN</state>
            <postalCode>66666</postalCode>
            <country>US</country>
            <phone>612-555-1234</phone>
        </billingAddress>
    </customer>
    <lineItems>
        <lineItem uri="#1">
            <productId>x23456</productId>
            <expectedUnitPrice>
                <amount>23.56</amount>
                <currencyCode>USD</currencyCode>
            </expectedUnitPrice>
            <quantity>2</quantity>
        </lineItem>
    </lineItems>
</rws:order>
```

Fulfillment Response Example XML

```
<?xml version="1.0" encoding="UTF-8"?>
<rws:fulfillment
uri="http://integration.digitalriver.com/integration/job/request/
DRRWS/fulfillment/123/"
    orderUri="http://dealer.acme.com/order/12345A6/"
xmlns:rws="http://integration.digitalriver.com/2005/10/RetailWebService"
    xmlns:xsi="http://www.w3.org/2001/XMLSchema-instance"
xsi:schemaLocation="http://integration.digitalriver.com/2005/10/RetailWebService
C:\projects\x-
stream\resources\ws\xsd\integration\rws\fulfill.xsd ">
    <status>
        <code>501</code>
        <message>no dice</message>
    </status>
    <totalCharge>
        <currencyCode>USD</currencyCode>
        <amount>22.52</amount>
    </totalCharge>
    <units>
        <unit uri="http://digitalriver.com/drws/fu/452455"
lineItemUri="1">
        <status>
            <code>200</code>
            <message>OK</message>
        </status>
        <actualPrice>
            <amount>23.56</amount>
            <currencyCode>USD</currencyCode>
        </actualPrice>
        <downloadUrl>ftp://foo/baz/bar.exe</downloadUrl>
```

TABLE 22-continued

The following provide examples of xml for some of the functions of the system. It
will be appreciated by those skilled in the art that other xml code could be
devised that performs the same functions without departing from the scope and
spirit of the present invention.

```
        <licenses>
            <license uri="http://digitalriver.com/drws/lic/42">
                <type>serialNo</type>
                <value>1120348MB67198749756</value>
            </license>
            <license uri="http://digitalriver.com/drws/lic/523">
                <type>unlockCode</type>
                <value>1120348MB67198749756</value>
            </license>
        </licenses>
    </unit>
    <unit uri="http://digitalriver.com/drws/fu/45246"
lineItemUri="1">
        <status>
            <code>602</code>
            <message>temporarily unavailable</message>
        </status>
        <licenses/>
    </unit>
    </units>
</rws:fulfillment>
```

Return Request

```
<?xml version="1.0" encoding="UTF-8"?>
<xsd:schema xmlns:xsd="http://www.w3.org/2001/XMLSchema"
    xmlns:map="http://internal.digitalriver.com/2005/10/type-map-
anno"
targetNamespace="http://integration.digitalriver.com/2005/10/RetailWebService"
xmlns="http://integration.digitalriver.com/2005/10/RetailWebService">
    <xsd:include schemaLocation="types.xsd" />
    <xsd:element name="returnRequest" type="ReturnRequestType" />
    <xsd:complexType name="ReturnRequestType">
        <xsd:sequence>
            <xsd:element name="reason" type="ReturnReasonType" />
            <xsd:element name="comment" type="xsd:string"/>
        </xsd:sequence>
        <xsd:attribute name="uri" type="xsd:anyURI" />
    </xsd:complexType>
    <xsd:simpleType name="ReturnReasonType">
        <xsd:restriction base="xsd:string">
            <xsd:enumeration value="CANCELLED_BUT_SHIPPED" />
            <xsd:enumeration value="CAN_NOT_DOWNLOAD" />
            <xsd:enumeration value="CUSTOMER_SATISFACTION_ISSUE" />
            <xsd:enumeration value="DAMAGED_PRODUCT" />
            <xsd:enumeration value="DELAYED_SHIPPING" />
            <xsd:enumeration value="DUPLICATE_ORDER" />
            <xsd:enumeration value="ORDER_PROCESSING_ERROR" />
            <xsd:enumeration value="ORDERED_WITHOUT_PERMISSION" />
            <xsd:enumeration value="PHONE_ORDER_ERROR" />
            <xsd:enumeration value="REFUSED_ORDER" />
            <xsd:enumeration value="UNDELIVERABLE_ADDRESS" />
            <xsd:enumeration value="WRONG_PRODUCT" />
        </xsd:restriction>
    </xsd:simpleType>
</xsd:schema>
```

Return Receipt

```
<?xml version="1.0" encoding="UTF-8"?>
<xsd:schema xmlns:xsd="http://www.w3.org/2001/XMLSchema"
    xmlns:map="http://internal.digitalriver.com/2005/10/type-map-
anno"
targetNamespace="http://integration.digitalriver.com/2005/10/RetailWebService"
xmlns="http://integration.digitalriver.com/2005/10/RetailWebService">
    <xsd:include schemaLocation="types.xsd" />
    <xsd:element name="returnReceipt" type="ReturnReceiptType" />
    <xsd:complexType name="ReturnReceiptType">
        <xsd:sequence>
            <xsd:element name="status" type="StatusType" />
        </xsd:sequence>
        <xsd:attribute name="uri" type="xsd:anyURI" />
        <xsd:attribute name="returnRequestUri" type="xsd:string" />
    </xsd:complexType>
<xsd:complexType name="StatusType">
    <xsd:sequence>
        <xsd:element name="code" type=" xsd:string "
```

TABLE 22-continued

The following provide examples of xml for some of the functions of the system. It will be appreciated by those skilled in the art that other xml code could be devised that performs the same functions without departing from the scope and spirit of the present invention.

```
        <xsd:element name="message" type=" xsd:string "
      </xsd:sequence>
    </xsd:complexType>
</xsd:schema>
```

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the web interface such that different dialog boxes are presented to a user that are organized or designed differently while maintaining substantially the same functionality without departing from the scope and spirit of the present invention.

What is claimed is:

1. A method for an integrated retailer website to sell products over a communication network to a customer where order fulfillment operations are performed by a third party ecommerce system, comprising steps of:
providing a product catalog service hosted on the third party ecommerce system through an extended markup language (XML) export function as a common catalog feed of products over the communication network to the integrated retailer website; and
utilizing a retail web service hosted on the third party ecommerce system operatively configured to provide fulfillment functions for the customer shopping through the integrated retailer website based on information in the common catalog feed through a representational state transfer type architecture such that the fulfillment functions are implemented as hypertext transfer protocol (HTTP) GET and POST operations on universal resource locations (URLs) that represent business resources.

2. The method of claim 1 wherein the retail web service defines a set of tools for common catalog filtering such that the integrated retailer website is modified based upon filtering of the common catalog feed.

3. The method of claim 1 further comprising a step of utilizing an access manager which is operatively configured to control access to the retail web service based upon an associated role for a principal such that usage privileges can be granted to the principal.

4. An integrated retailer system to sell products over a communication network to a customer where order fulfillment operations are performed by a third party ecommerce system, the integrated retailer system comprising:
a product catalog service hosted on the third party ecommerce system operatively configured to be provided through an extended markup language (XML) export function as a common catalog feed of products over the communication network to a retailer website; and
a retail web service hosted on the third party ecommerce system operatively configured to provide fulfillment functions for the customer shopping through the retailer website based on information in the common catalog feed through a representational state transfer type architecture such that the fulfillment functions are implemented as hypertext transfer protocol (HTTP) GET and POST operations on universal resource locations (URLs) that represent business resources.

5. The system of claim 4 wherein the retail web service comprises a set of tools for common catalog filtering such that the integrated retailer website is modified based upon filtering of the common catalog feed.

6. The system of claim 4 further comprising an access manager operatively configured to control access to the retail web service based upon an associated role for a principal such that usage privileges can be granted to the principal.

* * * * *